United States Patent [19]

Ueda

[11] Patent Number: 4,865,935

[45] Date of Patent: Sep. 12, 1989

[54] PHOTOSENSITIVE MEMBER COMPRISING AN AZO PIGMENT

[75] Inventor: Hideaki Ueda, Osaka, Japan

[73] Assignee: Minolta Camera Kabushiki Kaisha, Osaka, Japan

[21] Appl. No.: 154,584

[22] Filed: Feb. 10, 1988

[30] Foreign Application Priority Data

Feb. 17, 1987 [JP] Japan .................... 62-35185

[51] Int. Cl.$^4$ ............................... G03G 5/06
[52] U.S. Cl. ........................ 430/76; 430/58; 430/77; 430/78
[58] Field of Search ................ 430/72, 73, 76, 78, 430/58

[56] References Cited

U.S. PATENT DOCUMENTS

| | | | |
|---|---|---|---|
| 4,032,339 | 6/1977 | Grushkin et al. | 430/76 |
| 4,062,854 | 12/1977 | Grushkin | 544/211 |
| 4,123,270 | 10/1978 | Heil et al. | |
| 4,272,598 | 6/1981 | Sasaki et al. | 430/76 |
| 4,396,695 | 8/1983 | Dimmler et al. | 430/59 |
| 4,396,696 | 8/1983 | Nagasaka et al. | 430/78 |
| 4,426,432 | 1/1984 | Sawada et al. | 430/58 |
| 4,515,881 | 5/1985 | Sawada et al. | 430/72 |
| 4,533,613 | 8/1985 | Kawamura et al. | 430/78 |
| 4,537,847 | 8/1985 | Takahashi et al. | 430/58 |
| 4,540,651 | 9/1985 | Fujimaki et al. | 430/72 |
| 4,554,231 | 11/1985 | Ishikawa et al. | 430/59 |
| 4,582,771 | 4/1986 | Ohta | 430/58 |
| 4,631,242 | 12/1986 | Emoto et al. | 430/58 |
| 4,647,520 | 3/1987 | Watanabe et al. | 430/58 |
| 4,663,442 | 5/1987 | Ohta | 534/759 |
| 4,672,149 | 6/1987 | Yoshikawa et al. | 136/263 |
| 4,687,721 | 8/1987 | Emoto et al. | 430/58 |
| 4,702,982 | 10/1987 | Matsumoto et al. | 430/76 |
| 4,716,220 | 12/1987 | Tsutsui | 534/738 |
| 4,743,523 | 5/1988 | Yamashita et al. | 430/59 |
| 4,760,003 | 7/1988 | Matsumoto et al. | 430/58 |

FOREIGN PATENT DOCUMENTS

| | | |
|---|---|---|
| 54-22834 | 2/1979 | Japan . |
| 55-117151 | 9/1980 | Japan . |
| 59-214034 | 12/1984 | Japan . |
| 60-19152 | 1/1985 | Japan . |
| 60-121451 | 6/1985 | Japan . |
| 61-272755 | 12/1986 | Japan . |

*Primary Examiner*—John L. Goodrow
*Attorney, Agent, or Firm*—Burns, Doane, Swecker & Mathis

[57] ABSTRACT

The present invention relates to a photosensitive member containing a specific azo compound for a charge generating agent, which is improved in photosensitive properties, in particular, sensitivity.

7 Claims, No Drawings

PHOTOSENSITIVE MEMBER COMPRISING AN AZO PIGMENT

BACKGROUND OF THE INVENTION

This invention relates to a photosensitive member containing a new azo dye.

Known photosensitive materials for forming a photosensitive member include inorganic photoconductive materials such as selenium, cadmium sulfide or zinc oxide.

These photosensitive materials have many advantages such as low loss of charges in the dark, the electrical charge can be dissipated fast with irradiation of light and so on. However, they have disadvantages. For example, a photosensitive member based on selenium is difficult to produce, has high production costs and is difficult to handle due to inadequate resistivity to heat or mechanical impact. A photosensitive member based on cadmium sulfide or zinc oxide has defects such as unstable sensitivity in a highly humid environment and loss of stability with time because of the deterioration of dyestuffs, added as a sensitizer, by corona charge and fading with exposure.

Many kinds of organic photoconductive materials such as polyvinylcarbazole and so on have been proposed. These organic photoconductive materials have superior film forming properties, are light in weight, etc., but inferior in sensitivity, durability and environmental stability compared to the aforementioned inorganic photoconductive materials.

Various studies and developments have been in progress to overcome the above noted defects and problems. Function-divided photosensitive members of a laminated or a dispersed type have been proposed, in which charge generating function and charge transporting function are divided by different layers or different dispersed materials. The function-divided photosensitive member can be a highly efficient photosensitive member in electrophotographic properties such as chargeability, sensitivity, residual potential, durability with respect to copy and repetition because most adequate materials can be selected from various materials. Further, the function-divided photosensitive member has high productivity and low costs, since it can be prepared by coating, and suitably selected charge generating materials can freely control a region of photosensitive wavelength. Illustrative examples of such charge generating materials are organic pigments or dyes such as phthalocyanine pigment, cyanine pigment, polycyclic quinone pigment, perylene pigment, Perinone pigment, indigo dye, thioindigo dye, squarain compounds, etc., and inorganic materials such as selenium, selenium-arsenic, selenium-tellurium, cadmium sulfide, zinc oxide, amorphous silicon, etc.

However, such photosensitive members, which satisfy general static requirements, are not produced easily, and the sensitivity is desired to be much more improved.

SUMMARY OF THE INVENTION

The object of the invention is to provide a photosensitive member excellent in general static properties, in particular, sensitivity.

The present invention relates to a photosensitive member with a photosensitive layer comprising an azo compound represented by the following formula (I) on a substrate;

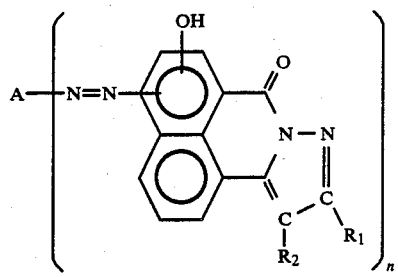

wherein A represents an aromatic hydrocarbon group or a heterocyclic group, which may be bonded through a bonding group; $R_1$ and $R_2$ independently represent any of hydrogen, halogen atom, or an alkyl group, an aralkyl group, an acyl group, an alkoxylcarbonyl group, an aryl group, a condensed polycyclic group or a condensed heterocyclic group, any of which may have a substituent; $R_1$, $R_2$ may combinedly form a cyclic ring; and n represents an integer of 1–4.

DETAILED DESCRIPTION OF THE INVENTION

The present invention provides a photosensitive member excellent in electrophotographic properties, in particular, sensitivity.

The present invention has accomplished the above object by introduction of a specific azo pigment as a charge generating material into a photosensitive member.

A photosensitive member provided according to the present invention contains a specific azo compound represented by the following formula (I)

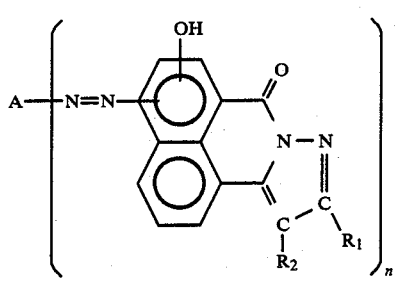

wherein A an aromatic hydrocarbon group or a heterocyclic group, which may be bonded through a bonding group; $R_1$ and $R_2$ independently represent any of hydrogen, halogen atom, or an alkyl group, an aralkyl group, an acyl group, an alkoxylcarbonyl group, an aryl group, a condensed polycyclic group or a condensed heterocyclic group, any of which may have a substituent; $R_1$ and $R_2$ may combinedly form a cyclic ring; and n represents an integer of 1–4.

A compound of the invention represented by the general formula (I) can be synthesized according to a known method. For example a N-amino compound represented by the general formula (II)

wherein A and n are the same as above, may be reacted with sodium nitrite in hydrochoric acid to give an azo compound, which may be coupled with an appropriate coupler represented by the following general formula (III) in the presence of alkali. As another method, the azo compound may be prepared by altering an N-amino compound to form an azo compound, isolating it as an addition with an acid such as HBF$_4$, and then subjecting it to a coupling reaction.

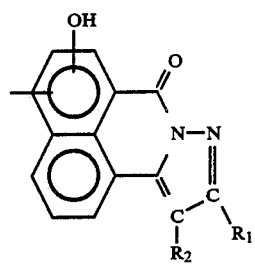
[III]

wherein R$_1$ and R$_2$ are the same as above.

A coupler component represented by the general formula (III) can be synthesized according to usual methods. That is, the coupler component may be prepared by cyclizing a hydrazone compound represented by the general formula (VI) in the presence of an alkaline condensing agent;

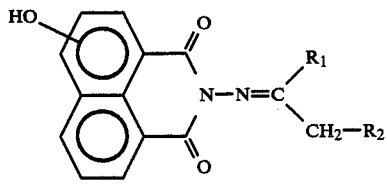
[VI]

The hydrazone compound (VI) is prepared by condensing a naphthalimide represented by the general formula (IV);

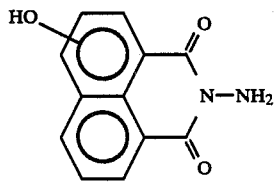
[IV]

with a carbonyl compound represented by the general formula (V);

[V]

wherein R$_1$ and R$_2$ are the same as (I) respectively.

When the hydrazone compound represented by the general formula (VI) is cyclized, the following two isomers generate.

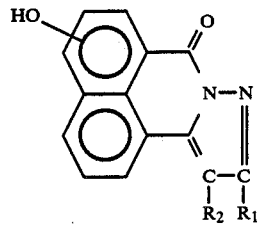

and

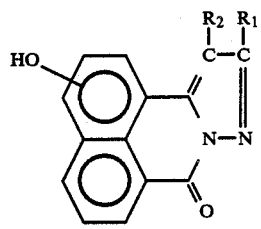

A coupler component represented by the general formula (III) may be one of the two isomers or a mixture of the two.

A preferred coupler component of the invention represented by the general formula (III) is shown below, but with no significance of restricting the embodiments of the invention.

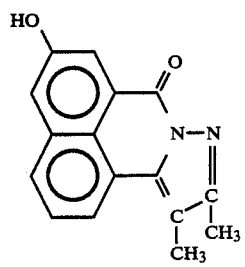
1.

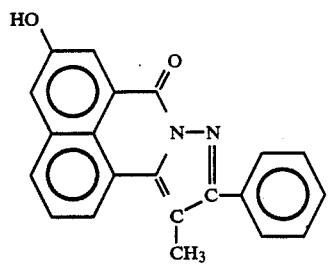
2.

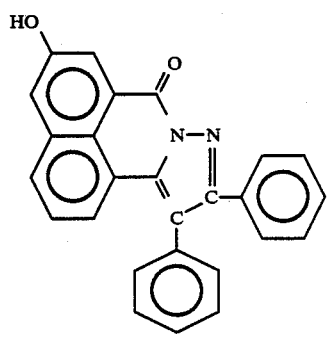
3.

-continued
4.
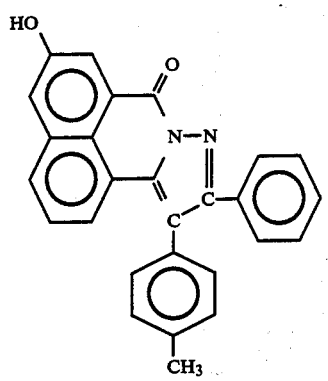
5.
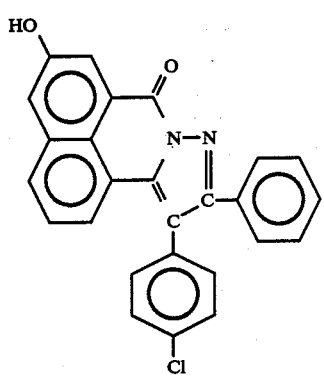
6.
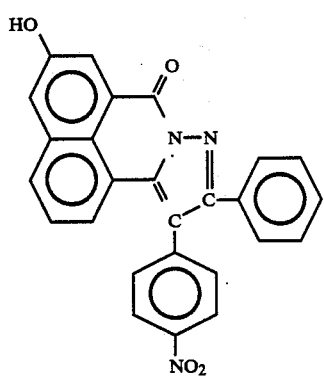
7.
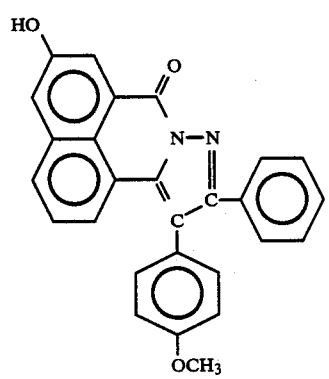
-continued
8.
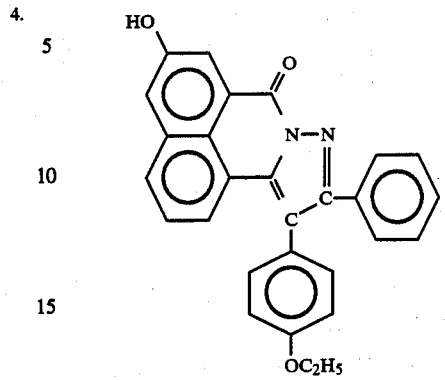
9.
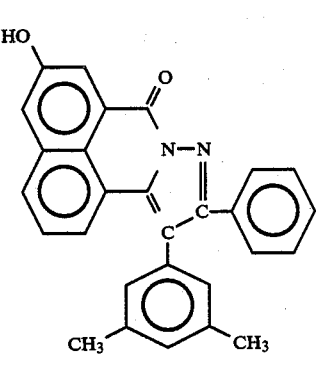
10.
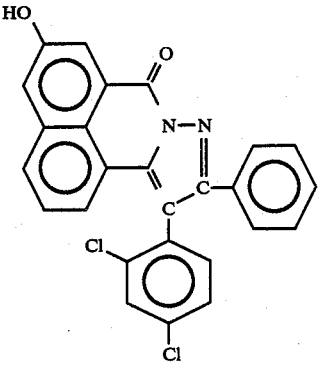
11.
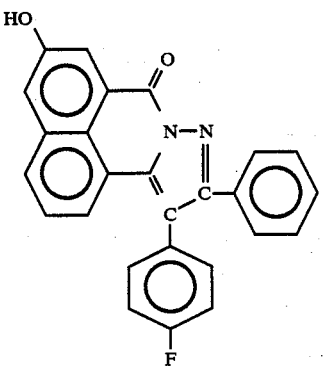

-continued
12.
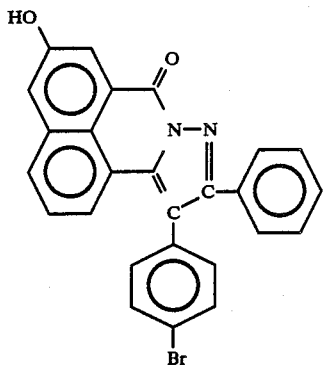
13.
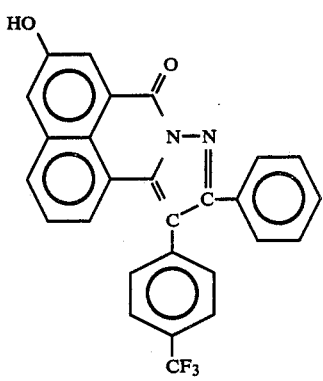
14.
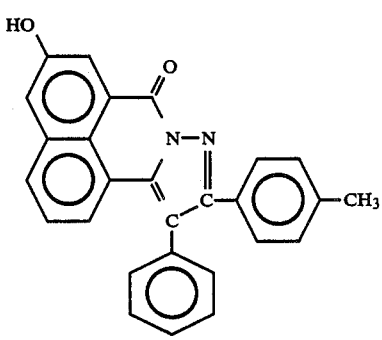
15.
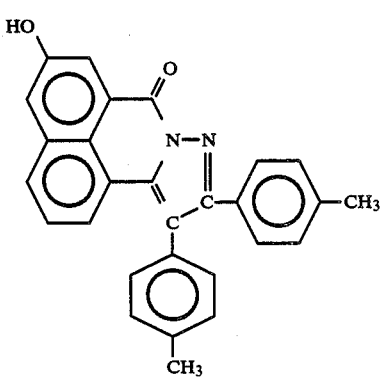
-continued
16.
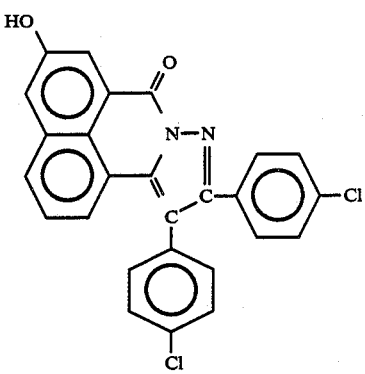
17.
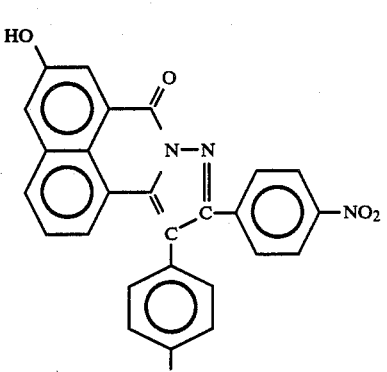
18.
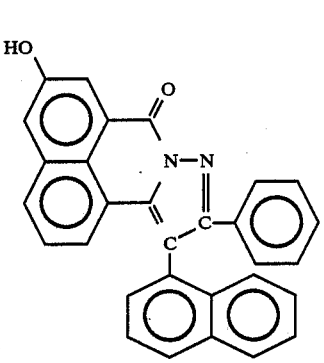
19.
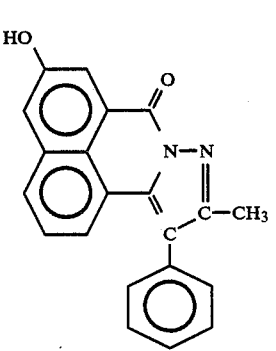

-continued
20.
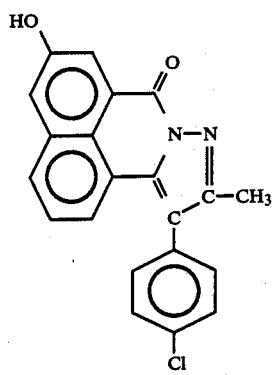
21.
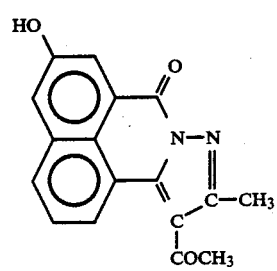
22.
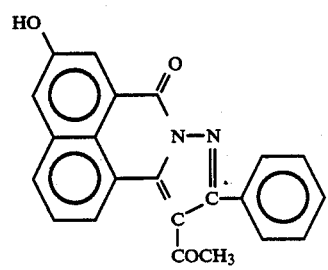
23.
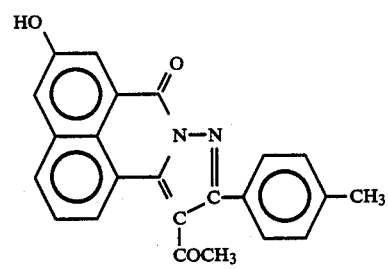
24.
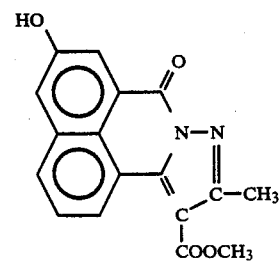
-continued
25.
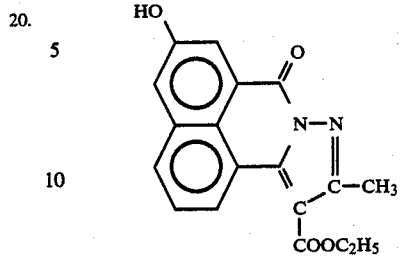
26.
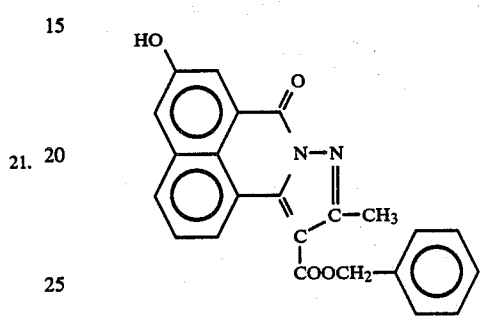
27.
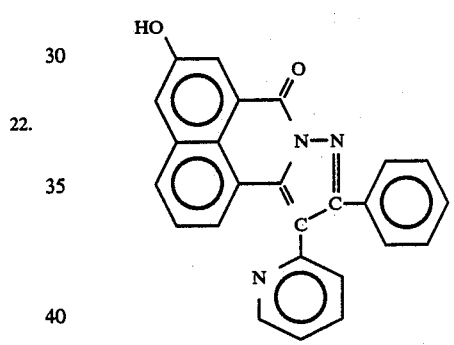
28.
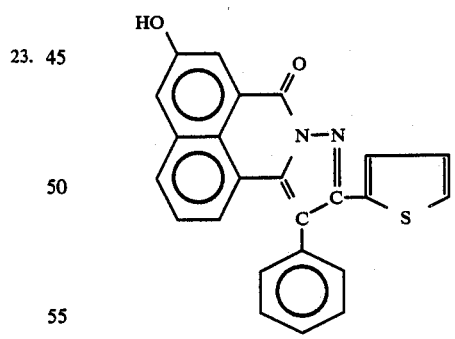
29.
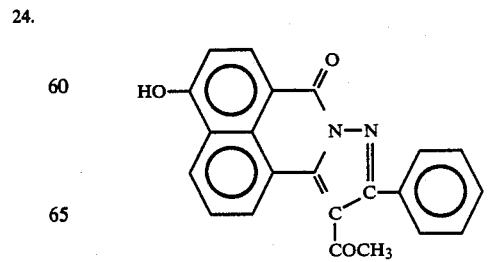

30. 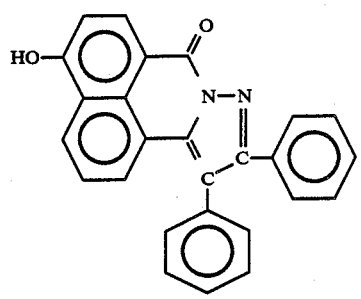
31. 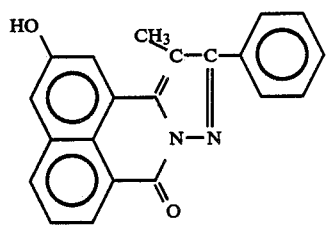
32. 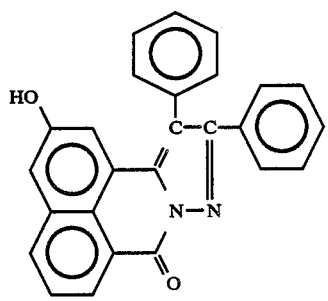
33. 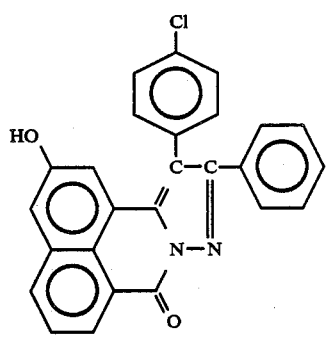
34. 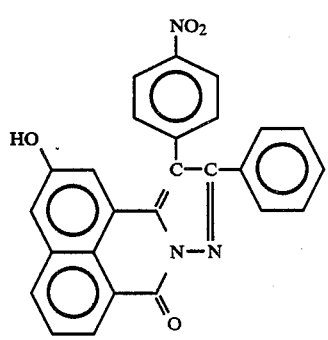
35. 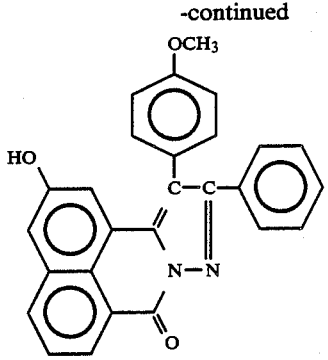
36. 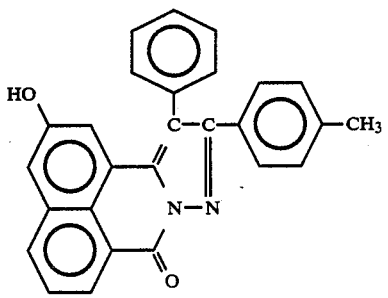
37. 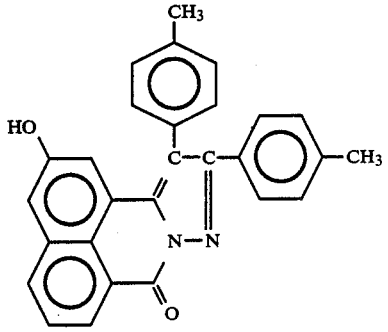
38. 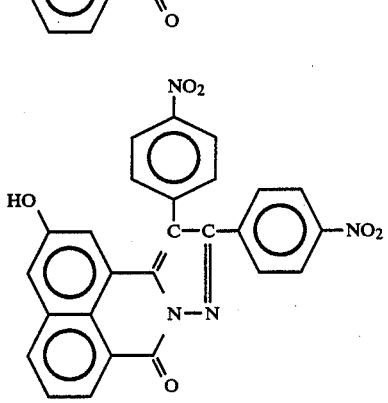
39. 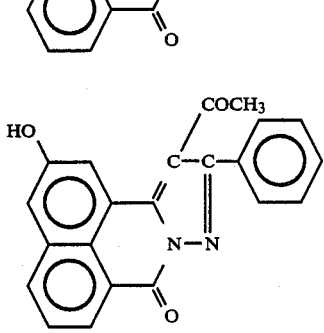

40. 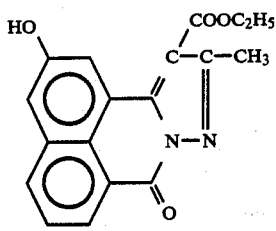

41. 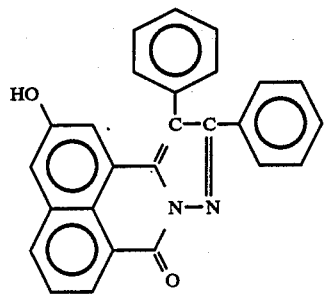

42. 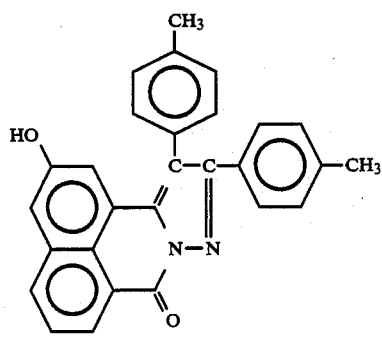

43. 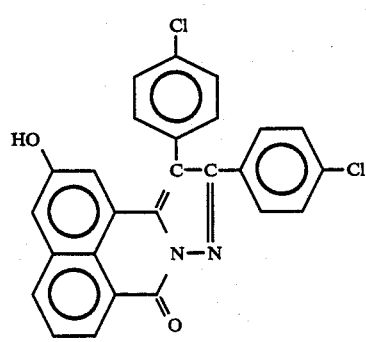

44. 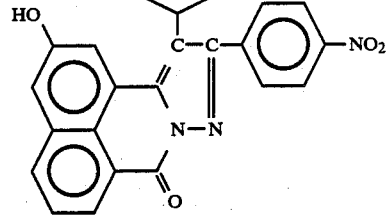

Preferred couplers above are shown by (1), (3), (5), (6), (14), (16), (17), (22), (25), (30), (31), (32), (33), (34), (35), (36), (37) and (38).

A method of production of a photosensitive member comprising an azo pigment represented by the general formula (I) with the above coupler component (1) is shown below, and other azo pigments with the other coupler components can be synthesized similarly according to the method of synthesis as below.

EXAMPLE OF SYNTHESIS 1

3,3'-Dichlorobenzidine (2.53 g, 0.01 mole) was dispersed in hydrochloric acid (100 ml). The dispersizon was stirred and cooled to 5° C., followed by the addition of an aqueous solution of sodium nitrite (1.4 g) in water (20 ml). Further, the mixture stirred as cooled for one hour, and then filtered. Borofluoric acid (10 g) was added to the filtrate, and then crystallized. The obtained crystals were filtered to give 3,3'-dichlorobenzidine tetrafluoroborate.

Then, the resultant diazonium salt (3.49 g, 0.01 mole) and the coupling agent (5.30 g) represented by the above coupling component (1) were dissolved in N-methylpyrrolidone (300 ml), to which a solution of sodium acetate (5 g) dissolved in water (100 ml) was added at 10°–20° C. for about 30 minutes. After addition, the solution was further stirred at the room temperature for 3.5 hours to filtrate deposited crystals.

The resultant crystals were dispersed in DMF (1 l), and the solution was stirred at the room temperature for 3.5 hours, followed by filtration of the crystals. This operation was repeated two more times. Then, the crystals were washed with water and dried to yield 6.8 g (84.9% of yield) of disazo pigment. Violet-red crystals.

| element | elemental analysis | | |
|---|---|---|---|
| | C | H | N |
| found | 66.07 | 3.12 | 14.12 |
| calcd. | 65.92 | 3.25 | 13.98 |

Components of A in the general formula (I) of the invention are shown below with no significance of restricting the embodiments.

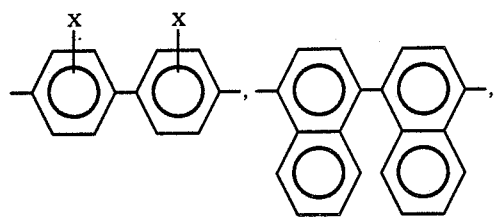
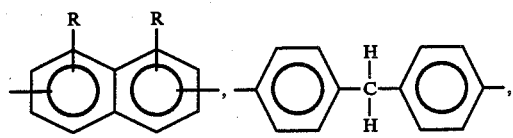
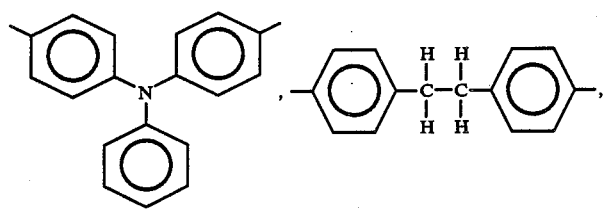
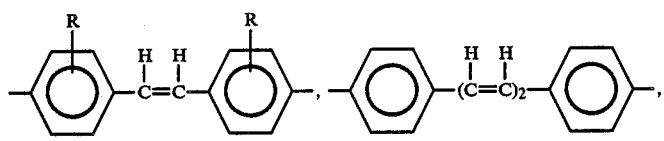
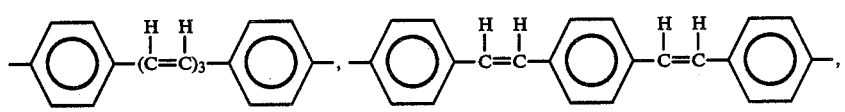
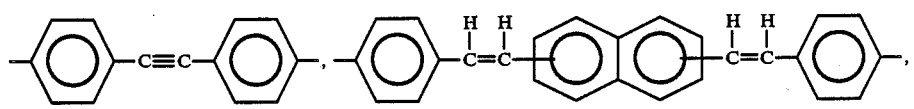
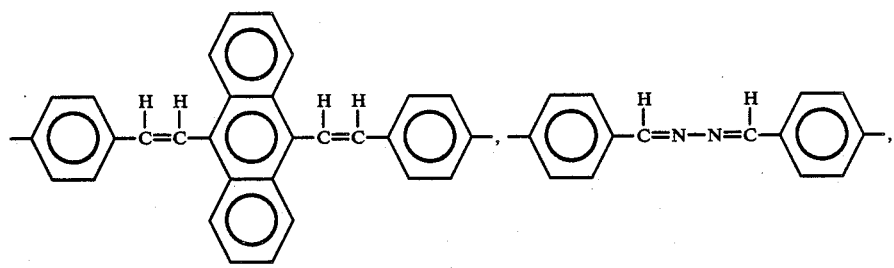
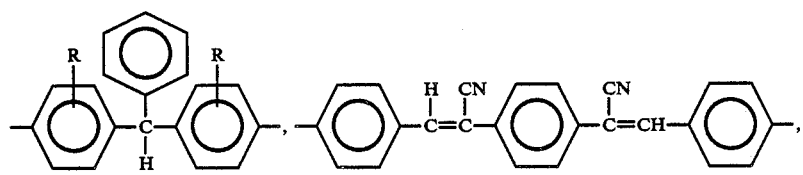
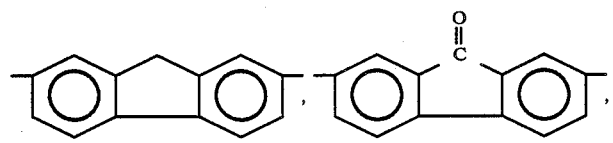

-continued
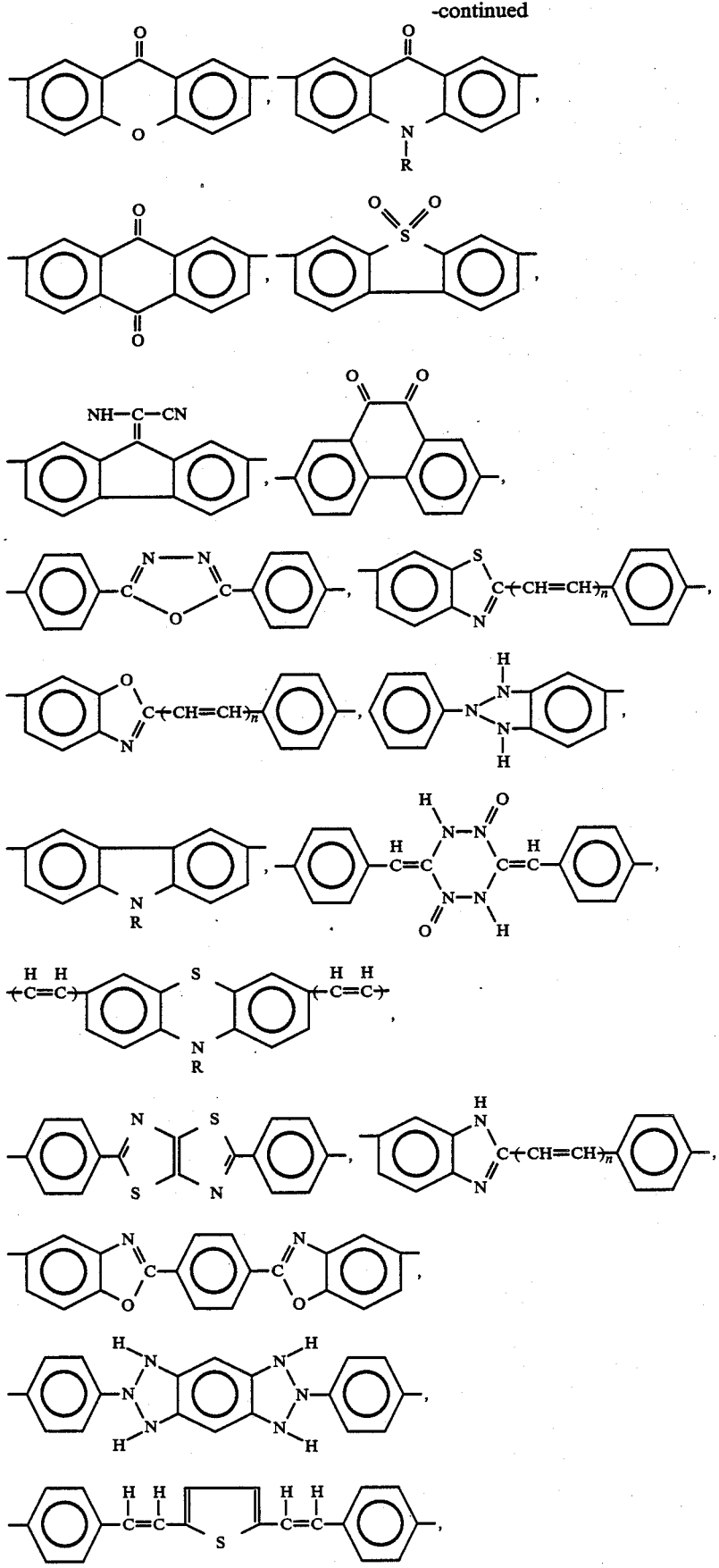

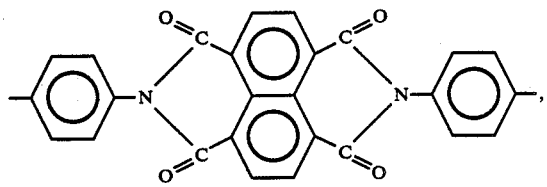

wherein X and R represent a hologen atom, hydrogen, an alkyl group or an alkoxyl group respectively, and n is an integer of 0 or 1.

A photosensitive member of the invention has a photosensitive layer comprising one or more of azo pigments represented by the aforementioned general formula (I). A photosensitive member, various types of which are known, may be any type in the invention. For example, a photosensitive member of the invention may be a monolayer type in which a photosensitive layer is formed on a substrate by dispersing azo pigments in a resin binder or a charge transporting medium, or a laminated type in which first a charge generating layer containing mainly an azo pigment is formed on a substrate and then a charge transporting layer is formed on the charge generating layer. An azo pigment of the invention functions as a photoconductive material and generates charges with very high efficiency by absorbing light. The generated charges may be transported with an azo pigment as a medium, but more effectively with a charge transporting material as a medium.

In order to form a photosensitive member of a monolayer type, fine particles of azo pigments are dispersed in a resin solution or a solution containing a charge transporting compound and resin, which is spray dried on an electrically conductive substrate. The thickness of the photosensitive layer is 3–30 μm, preferably 5–20 μm. The sensitivity is poor if the azo pigment is used in an unsufficient quantity, whereas the chargeability is poor and the mechanical strength of photosensitive layer is inadequate if used to excess. The amount of an azo pigment is within the range of 0.01–2 parts by weight, preferably, 0.2–1.2 parts by weight on the basis of one part by weight of resin. If a charge transporting material such as polyvinylcarbazole which is capable of using as a binder itself is used, an additional amount of an azo pigment is preferably 0.01–0.5 parts by weight on the basis of one part by weight of charge transporting materials.

In order to form a photosensitive member of a laminated type, an azo pigment is deposited in a vacuum on a substrate, an azo pigment is dissolved in an amine solvent to apply onto a substrate or an application solution containing a pigment and, if necessary, binder resin dissolved in an appropriate solvent is applied onto a substrate to be dried.

Then, a solution containing a charge transporting material and a binder is applied onto the charge generating layer. The thickness of the azo pigment-containing layer as a charge generating layer is 4 μm or less, preferably, 2 μm or less. It is suitable that the charge-transporting layer has a thickness in the range 3–30 μm, preferably 5–20 μm, and the proportion of charge transporting materials in the charge-transporting layer is 0.2–2 parts by weight, preferably 0.3–1.3 parts by weight on the basis of one part by weight of the binder. There is no need to use a binder when the charge-transporting material is of a high-polymer which is capable of serving as a binder itself.

A photosensitive member of the present invention permits, in combination with the binder, the use of a plasticizer, such as halogenated paraffin, polybiphenyl chloride, dimethyl naphthalene, dibutyl phthalate or O-terphenyl, the use of an electron-attractive sensitizer, such as chloranyl, tetracyanoethylene, 2,4,7-trinitrofluorenone, 5,6-dicyanobenzoquinone, tetracyanoquinodimethane, tetrachlorphthalic anhydride, or 3,5-dinitrobenzoic acid, and the use of a sensitizer, such as methyl violet, rhodamine B, cyanine dye, pyrylium salt, and thiapyrylium salt. Applicable as a binder in the practice of this invention are any of thermoplastic resins and thermosetting resins which are publicly known to be electrically insulative and any of photocuring resins and photoconductive resins.

Some examples of suitable binders are thermoplastic resins such as saturated polyester, polyamide, acrylic, ethylene-vinyl acetate copolymer, ion cross-linked olefin copolymer (ionomer), styrene-butadiene block copolymer, polycarbonate, vinyl chloride-vinyl acetate copolymer, cellulose ester, polyimide, styrol, etc., and thermosetting resins such as, epoxy, urethane, silicone, phenolic, melamine, xylene, alkyd, thermosetting acrylic, etc., and photocuring resins, and photoconductive resins such as poly-N-vinyl carbazole, polyvinyl pyrene, polyvinyl anthracene, etc., all named without any significance of restricting the use to them. Any of these resins can be used singly or in combination with other resins. It is desirable for any of these electrically insulative resins to have a volume resistance of $1 \times 10^{12}$ Ω·cm or more when measured singly.

Illustrative examples of charge transporting materials are hydrazone compounds, pyrazoline compounds, styryl compounds, triphenylmethane compounds, oxadiazol compounds, carbazole compounds, stilbene compounds, enamine compounds, oxazole compounds, triphenylamine compounds, tetraphenylbenzidine, azine compounds and so on, including carbazole, N-ethylcarbazole, N-vinylcarbazole, N-phenylcarbazole, tethracene, chrysene, pyrene, perylene, 2-phenylnaphthalene, azapyrene, 2,3-benzochrysene, 3,4-benzopyrene, fluorene, 1,2-benzofluorene, 4-(2-fluorenylazo)-resorcinol, 2-p-anisolaminofluorene, p-diethylaminoazobenzene, cadion, N,N-dimethyl-p-phenylazoaniline, p-(dimethylamino)stilbene, 1,4-bis(2-methylstyryl)benzene, 9-(4-diethylaminostyryl)anthracene, 2,5-bis(4-diethylaminophenyl)-1,3,5-oxadiazole, 1-phenyl-3-(p-diethylaminostyryl)-5-(p-diethylaminophenyl)-pylazoline, 1-phenyl-3-phenyl-5-pylazolone, 2-(m-naphtyl)-3-phenyloxazole, 2-(p-diethylaminostyryl)-6-dietylaminobenzoxazole, 2-(p-diethylaminostyryl)-6-dietylaminobenzothiazole, bis(4-diethylamino-2-methylphenyl)phenylmethane, 1,1-bis(4-N,N-diethylamino-2-ethylphenyl)heptane, N,N-diphenylhydrazino-3-methylidene-10-ethylphenoxazine, N,N- diphenylhydrazino-3-methylidene-10-ethylphenothiazine, 1,1,2,2-tetrakis-(4-N,N-diethylamino-2-ethylphenyl)ethane, p-diethylaminobenzaldehyde-N,N-diphenylhydrazone, p-diphenylaminobenzaldehyde-N,N-diphenylhydrazone, N-ethylcarbazole-N-methyl-N-phenylhydrazone, p-diethylaminobenzaldehyde-N-α-naphthyl-N-phenylhydrazone, p-diethylaminobenzaldehyde-3-methylbenzothiazolinone-2-hydrazone, 2-methyl-4-N,N-diphenylamino-β-phenylstilbene, α-phenyl-4-N,N-diphenylaminostilbene and so on. Any of these resin can be used singly or in combination with other resin.

A photosensitive member thus formed may have an adhesion layer or a barrier layer between a substrate and a photosensitive layer. Suitable examples contained in these layers are polyimide, polyamide, nitrocellulose, polyvinyl butyral, polyvinyl alcohol, aluminium oxide and so on. It is preferable that the thickness of the layer is 1 μm or less.

An azo compound of the invention is effective, in particular, as a charge generating material used in a laminated-type photosensitive member. Concrete examples are shown below.

EXAMPLE 1

The azo compound of 0.45 parts by weight of the invention wherein A was

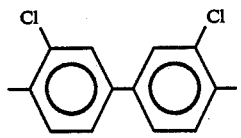

and the coupler was (1) component in the general formula (I), 0.45 part by weight of polyester resin (Vylon 200 made by TOYOBO) and 50 parts by weight of cyclohexanone were taken in a Sand grinder for dispersion. The dispersion solution of the bisazo pigment was dispersed onto aluminotype-Mylar of 100 μm in thickness by a film applicator to form a charge generating layer so that a thickness of the dried layer is 0.3 g/m². A solution of 70 parts of p-diphenylaminobenzaldehyde-N,N-diphenylhydrazone and 70 parts of polycabonate resin (K-1300; made by TEIJIN KASEI) dissolved in 400 parts of dioxane was dispersed onto the above formed charge generating layer to form a charge transporting layer so that the thickness of the dried layer is 16 μm. Thus, a photosensitive member with the two layers was prepared.

Exposure values for half-reducing ($E_{\frac{1}{2}}$) are shown table 1. The exposure value for half reducing, which is the exposure amount required for the surface potential to be half the value of the initial surface potential, is measured by first charging a photosensitive member by means of a corona-discharge of −6.5 KV in the dark and then exposing the member to white light of 5 lux in illuminance.

EXAMPLES 2–4

Photosensitive members were prepared in a manner similar to EXAMPLE 1, except that the coupler components (3), (5), and (6) were used.

EXAMPLES 5–8

Photosensitive members were prepared in a manner similar to EXAMPLE 1, except that azo components, wherein A was

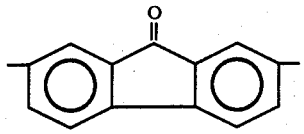

and the coupler components were (3), (6), (14) and (17) in the general formula (I), were used.

The results are shown in Table 1.

TABLE 1

| example | A | coupler | $E_{\frac{1}{2}}$ (lux · sec) |
|---|---|---|---|
| 1 | Cl—⌬—⌬—Cl | 1 | 4.3 |
| 2 | Cl—⌬—⌬—Cl | 3 | 3.5 |
| 3 | Cl—⌬—⌬—Cl | 5 | 3.2 |
| 4 | Cl—⌬—⌬—Cl | 6 | 3.0 |
| 5 | fluorenone | 3 | 2.9 |
| 6 | fluorenone | 6 | 2.8 |
| 7 | fluorenone | 14 | 2.6 |
| 8 | fluorenone | 17 | 2.3 |

EXAMPLES 9-12

Photosensitive members were prepared in a manner similar to EXAMPLE 1 except that α-phenyl-4-N,N-diphenylaminostilbene was used as a charge transporting material and azo components, wherein A was

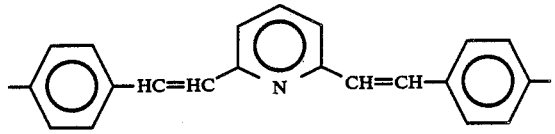

and the preferred coupler components were (3), (16),

EXAMPLES 13-16

Photosensitive members were prepared in a similar way as EXAMPLE 9 except that azo components, wherein A was

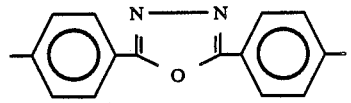

and the coupler components were (3), (7), (16) and (17) in the general formula (I) were used.
The results are shown in Table 2.

TABLE 2

| example | A | coupler | E½ (lux · sec) |
|---|---|---|---|
| 9 | —⟨phenyl⟩—HC=HC—⟨pyridine(N)⟩—CH=CH—⟨phenyl⟩— | 3 | 3.0 |
| 10 | —⟨phenyl⟩—HC=HC—⟨pyridine(N)⟩—CH=CH—⟨phenyl⟩— | 16 | 2.7 |
| 11 | —⟨phenyl⟩—HC=HC—⟨pyridine(N)⟩—CH=CH—⟨phenyl⟩— | 22 | 3.1 |
| 12 | —⟨phenyl⟩—HC=HC—⟨pyridine(N)⟩—CH=CH—⟨phenyl⟩— | 25 | 3.5 |
| 13 | —⟨phenyl⟩—C(=N—N=)C—⟨phenyl⟩— (oxadiazole) | 3 | 2.5 |
| 14 | —⟨phenyl⟩—C(=N—N=)C—⟨phenyl⟩— (oxadiazole) | 7 | 2.9 |
| 15 | —⟨phenyl⟩—C(=N—N=)C—⟨phenyl⟩— (oxadiazole) | 16 | 2.3 |
| 16 | —⟨phenyl⟩—C(=N—N=)C—⟨phenyl⟩— (oxadiazole) | 17 | 2.4 |

(22) and (25) in the general formula (I) were used.
The results are shown in Table 2.

EXAMPLES 17-20

Photosensitive members were prepared in a manner similar to EXAMPLE 1 except that

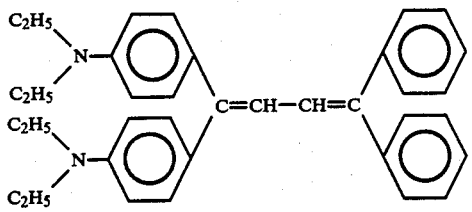

was used as a charge transporting material instead of p-diphenylaminobenzaldehyde-N,N-diphenylhydrazone, azo components wherein A was

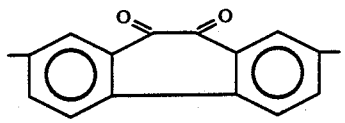

and the coupler components were a mixture of (3) and (32), a mixture of (14) and (36), a mixture of (22) and (39), and (3) itself in the general formula (I) were used. The results are shown in Table 3.

TABLE 3

| example | A | coupler | E½ (lux · sec) |
|---|---|---|---|
| 17 | (structure) | 3 and 32 | 2.1 |
| 18 | (structure) | 14 and 36 | 2.0 |
| 19 | (structure) | 22 and 39 | 2.4 |
| 20 | (structure) | 3 | 2.1 |

EXAMPLES 21-24

Photosensitive members were prepared in a manner similar to EXAMPLE 1 except that azo components, wherein A was

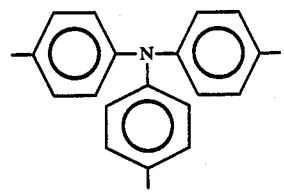

and the coupler components were a mixture of (3) and (32), a mixture of (14) and (36), a mixture of (6) and (34), a mixture of (15) and (37) in the general formula (I) were used, and

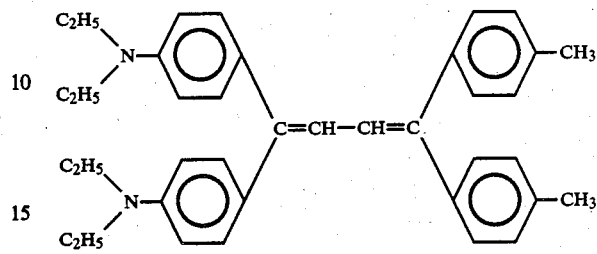

was used as a charge transporting material.
The results are shown in Table 4.

TABLE 4

| example | A | coupler | E½ (lux · sec) |
|---|---|---|---|
| 21 | (structure) | 3 and 32 | 2.0 |
| 22 | (structure) | 14 and 36 | 1.8 |
| 23 | (structure) | 6 and 34 | 2.2 |
| 24 | (structure) | 15 and 37 | 1.7 |

COMPARATIVE EXAMPLE 1

A photosensitive member was prepared in a manner similar to EXAMPLE 1 except that the compound represented by the formula;

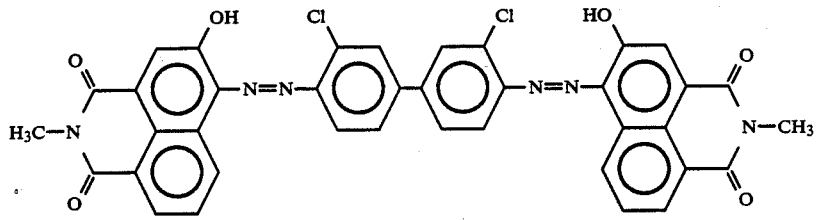

as a charge generating material, was used.

$E_{\frac{1}{2}} = 10.2$ lux·sec.

COMPARATIVE EXAMPLE 2

A photosensitive member was prepared in a manner similar to EXAMPLE 1 except that the compound represented by the formula;

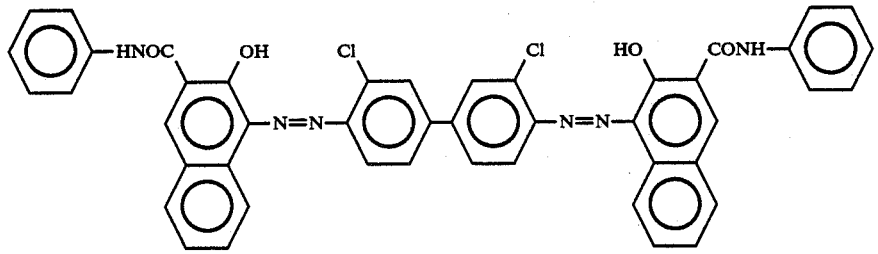

as a charge generating material, was used.

$E_{\frac{1}{2}} = 6.3$ lux·sec.

What is claimed is:

1. A photosensitive member with a photosensitive layer comprising an azo compound represented by the following formula (I) on a substrate;

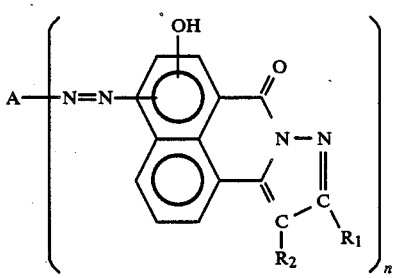

[I]

wherein A represents an aromatic hydrocarbon group or a heterocyclic group, which may be bonded through a bonding group; $R_1$ and $R_2$ independently represent any of hydrogen, halogen atom, or an alkyl group, an aralkyl group, an acyl group, an alkoxylcarbonyl group, an aryl group, a condensed polycyclic group or a condensed heterocyclic group, any of which may have a substituent; $R_1$, $R_2$ may combinedly form a cyclic ring; and n represents an integer of 1–4.

2. The photosensitive member of claim 1, which essentially consists of a charge generating layer, a charge transporting layer and an electroconductive substrate wherein the charge generating layer contains the azo compound dissolved or dispersed in a binder.

3. The photosensitive member of claim 1, which essentially consists of a charge generating layer, a charge transporting layer and an electroconductive substrate wherein the charge generating layer contains the azo compound formed by deposition in vacuum.

4. The photosensitive member of claim 2, in which the thickness of the charge transporting layer is about 3–30 μm, and the thickness of the charge generating layer is not more than about 4 μm.

5. The photosensitive member of claim 1, which essentially consists of a photoconductive monolayer on an electroconductive substrate wherein the photoconductive monolayer contains the azo compound dissolved or dispersed in a binder.

6. The photosensitive member of claim 5, in which the azo compounds are contained at a proportion of 0.01–2 parts by weight against one part by weight of the binder.

7. The photosensitive member of claim 5, in which the thickness of the photoconductive monolayer is about 3–30 μm.

* * * * *